(12) United States Patent
Gaal et al.

(10) Patent No.: US 9,179,427 B2
(45) Date of Patent: Nov. 3, 2015

(54) TRANSMISSION POWER DEPENDENT IMBALANCE COMPENSATION FOR MULTI-ANTENNA SYSTEMS

(75) Inventors: Peter Gaal, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 620 days.

(21) Appl. No.: 13/101,827

(22) Filed: May 5, 2011

(65) Prior Publication Data

US 2012/0115531 A1    May 10, 2012

Related U.S. Application Data

(60) Provisional application No. 61/332,654, filed on May 7, 2010.

(51) Int. Cl.
| | |
|---|---|
| *H04B 7/00* | (2006.01) |
| *H04B 7/185* | (2006.01) |
| *H04W 52/58* | (2009.01) |
| *H04B 7/04* | (2006.01) |
| *H04L 25/02* | (2006.01) |
| *H04L 25/03* | (2006.01) |
| *H04W 52/14* | (2009.01) |
| *H04W 52/42* | (2009.01) |

(52) U.S. Cl.
CPC .............. *H04W 52/58* (2013.01); *H04B 7/04* (2013.01); *H04L 25/0202* (2013.01); *H04L 25/03343* (2013.01); *H04W 52/146* (2013.01); *H04W 52/42* (2013.01)

(58) Field of Classification Search
CPC ... H04B 7/04; H04L 25/0202; H04L 25/03343; H04W 52/146; H04W 52/42; H04W 52/58
USPC .............................. 455/522, 125, 13.4, 127.2
See application file for complete search history.

(56) References Cited

U.S. PATENT DOCUMENTS

| | | | |
|---|---|---|---|
| 8,583,160 | B2 | 11/2013 | Gaal et al. |
| 2006/0013182 | A1 | 1/2006 | Balasubramanian et al. |

(Continued)

FOREIGN PATENT DOCUMENTS

| | | |
|---|---|---|
| CN | 101651474 A | 2/2010 |
| JP | 4308655 B2 | 8/2009 |

(Continued)

OTHER PUBLICATIONS

International Search Report and Written Opinion—PCT/US2011/035629—ISA EPO—Aug. 3, 2011.

(Continued)

*Primary Examiner* — Ping Hsieh
*Assistant Examiner* — Xin Jia (57) ABSTRACT

Methods and apparatuses for wireless communication are provided. In an aspect, Transmissions are received from multiple antennas of a user equipment and a differential power control message that is based on an imbalance of transmitted power from the multiple antennas is transmitted. In another aspect, a differential power control message that is based on an imbalance of transmitted power from multiple antennas of a user equipment is received and based on the message, the imbalance is compensated for by varying a transmit power from one or more of the multiple antennas.

36 Claims, 7 Drawing Sheets (56) References Cited

U.S. PATENT DOCUMENTS

| | | | |
|---|---|---|---|
| 2006/0034382 A1 | 2/2006 | Ozluturk et al. | |
| 2006/0088125 A1 | 4/2006 | Miyatani et al. | |
| 2006/0291582 A1 | 12/2006 | Walton et al. | |
| 2008/0182611 A1 | 7/2008 | Han et al. | |
| 2011/0201376 A1* | 8/2011 | Hu et al. | 455/522 |
| 2011/0237290 A1 | 9/2011 | Nishikawa et al. | |
| 2011/0243007 A1* | 10/2011 | Xiao | 370/252 |
| 2011/0306383 A1* | 12/2011 | Lee et al. | 455/522 |

FOREIGN PATENT DOCUMENTS

| | | |
|---|---|---|
| JP | 2010103965 A | 5/2010 |
| WO | WO-03026335 A1 | 3/2003 |
| WO | WO-2003026335 A1 | 3/2003 |
| WO | WO2004056009 A1 | 7/2004 |

OTHER PUBLICATIONS

Motorola: "On UL Multi-Antenna Transmission Modes and Signaling Support", 3GPP Draft; R1-103178 UL-MIMO Mode (Motorola) Final-Clean, 3rd Generation Partnership Project (3GPP), Mobile Competence Centre ; 650, Route Des Lucioles ; F-06921 Sophia-Antipolis Cedex ; France, [Online] vol. RAN WG1, No. Montreal, Canada; 20100510, May 6, 2010, XP050420387, Retrieved from the Internet:URL:http://list.etsi.org/scripts/wa.exe"AZ=ind1005a&L=3gpp_tsg_ran_wgl&T=0&P=27406> [retrieved on Jul. 19, 2011] p. 2-p. 3.

Nokia: "Reduced CQI design for DLSU-MIMO" , 3GPP Draft; R1-070994, 3rd Partnership Project (3GPP), Mobile Competence Centre ; 650, Route Des Lucioles ; F-06921 Sophia-Antipolis Cedex ; France, vol. RAN WG1, No. S t . Louis, USA; 20070206, Feb. 6, 2007, XP050104995 [retrieved on Feb. 6, 2007] p. 2.

NTT DOCOMO: "Uplink Power Control for Multi-antenna Transmission", 3GPP Draft; R1-103250 UL Multi-Antenna PC, 3rd Generation Partnership Project (3GPP), Mobile Competence Centre ; 650, Route Des Lucioles ; F-06921.

Sophia-Antipolis Cedex ; France, vol . RAN WG1, No. Montreal, Canada; 20100510, May 4, 2010, XP050420278, [retrieved on May 2010-041 p. 1-p. 2].

Qualcomm Europe: "LTE-A PA configurations" , 3GPP Draft; R4-093201 LTE-A PA Configurations, 3rd Generation Partnership Project (3GPP), Mobile Competence Centre ; 650, Route Des Lucioles ; F-06921 Sophia-Antipolis Cedex ; France, No. Shenzhen, China; 20090824, Aug. 24, 2009, XP050392875, [ retrieved on Aug. 31, 2009] p. 1-p. 2.

Motorola, "Multi-Antenna Uplink Transmission for LTE-A", 3GPP Draft, R1-084403 Multi-Antenna UL Transmission (Motorola), 3RD Generation Partnership Project (3GPP), Mobile Competence Centre, 650, Route Des Lucioles, F-06921 Sophia-Antipolis Cedex, France, No. Prague, Czech Republic, 20081105, Nov. 5, 2008, XP050317665.

Qualcomm Europe, "Calibration Procedures for TDD Beamforming", 3GPP Draft, R1-080494, 3RD Generation Partnership Project (3GPP), Mobile Competence Centre, 650, Route Des Lucioles, F-06921 Sophia-Antipolis Cedex, France, vol. RAN WGI, No. Sevilla, Spain, 20080109, Jan. 9, 2008, XP050109010.

Samsung, "UL Transmission Power Control, in LTE-A", 3GPP Draft, RI-091250 LTE-A TPC, 3RD Generation Partnership Project (3GPP), Mobile Competence Centre, 650, Route Des Lucioles, F-06921 Sophia-Antipolis Cedex, France, No. Seoul, Korea, 20090318, Mar. 18, 2009, XP050338862.

Wang Y et al., "Power optimization for maximum channel capacity in MIMO relay system", Journal of China Universities of Posts and Telecommunications, XX, CN LNKDDOI,10.1016/S1005-8885(07)60141-1, vol. 14, No. 3, Sep. 1, 2007, pp. 10-15, XP022938017.

"3rd Generation Partnership Project; Technical Specification Group Radio Access Network; Evolved Universal Terrestrial Radio Access (E-UTRA); User Equipment (UE) radio transmission and reception (Release 9)", 3GPP TS 36.101 V9.2.0 (Dec. 2009), Sophia Antipolis Valbonne—France.

"3rd Generation Partnership Project; Technical Specification Group Radio Access Network; Evolved Universal Terrestrial Radio Access (E-UTRA); Physical layer procedures (Release 9)", 3GPP TS 36.213 V9.1.0 (Mar. 2010), Sophia Antipolis Valbonne—France.

"3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.0.0 (Mar. 2010), Sophia Antipolis Valbonne—France.

Motorola, "UL Power Control for Multi-Antenna UE", 3GPP TSG RAN1 #60, R1-101115, San Francisco, USA, Feb. 22-26, 2010.

Samsung, "UL power headroom report and SU-MIMO power control", 3GPP TSG RAN WG1 Meeting #60, R1-101149, San Francisco, USA, Feb. 22-26, 2010.

Huawei, "Uplink transmission modes", 3GPP TSG RAN WG1 meeting #60bis, R1-101964, Beijing, China, Apr. 12-16, 2010.

Samsung, "UL SU-MIMO power control", 3GPP TSG RAN WG1 Meeting #60bis, R1-102182,Beijing, China, Apr. 12-16, 2010.

NTT DOCOMO, "Uplink Power Control for Multi-antenna Transmission", 3GPP TSG RAN WG1 Meeting #60bis, R1-102294, Beijing, China, Apr. 12-16, 2010.

\* cited by examiner

TRANSMISSION POWER DEPENDENT IMBALANCE COMPENSATION FOR MULTI-ANTENNA SYSTEMS

CROSS REFERENCE TO RELATED APPLICATIONS

The present application for patent claims benefit of U.S. Provisional Patent Application Ser. No. 61/332,654, entitled, "Transmission Power Dependent Imbalance Compensation For Multi-Antenna Systems," filed May 7, 2010, and assigned to the assignee hereof and hereby expressly incorporated by reference herein.

TECHNICAL FIELD

Certain aspects of the present disclosure generally relate to wireless communications and, more particularly, to combining the benefits of improved link efficiency at low power levels obtained by imbalance compensation and preserving battery life at high power levels.

BACKGROUND

Wireless communication systems are widely deployed to provide various types of communication content, such as voice and data. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. These communication links may be established via a single-input-single-output, multiple-input-single-output or a multiple-input-multiple-output (MIMO) system.

Wireless standards may contain power control techniques to control and limit the transmission power utilized by each user equipment (UE) for uplink transmission. For example, the power control technique defined in the LTE standard generates a single, common power value for each UE that may be used for all the antennas of the UE. However, different antennas of the UE may experience different fading environments at different points in time.

SUMMARY

Certain aspects of the present disclosure provide a method for wireless communications. The method includes receiving transmissions from multiple antennas of a user equipment and transmitting a differential power control message that is based on an imbalance of transmitted power from the multiple antennas.

Certain aspects of the present disclosure provide an apparatus for wireless communications. The apparatus includes means for receiving transmissions from multiple antennas of a user equipment and means for transmitting a differential power control message that is based on an imbalance of transmitted power from the multiple antennas.

Certain aspects of the present disclosure provide an apparatus for wireless communications. The apparatus includes at least one processor configured to receive transmissions from multiple antennas of a user equipment and to transmit a differential power control message that is based on an imbalance of transmitted power from the multiple antennas.

Certain aspects provide a computer-program product for wireless communications. The computer-program product includes a computer-readable storage medium having instructions stored thereon, the instructions for causing a computer to receive transmissions from multiple antennas of a user equipment and to transmit a differential power control message that is based on a perceived imbalance of transmitted power from the multiple antennas.

Certain aspects of the present disclosure provide a method for wireless communications. The method includes receiving, from a base station, a differential power control message that is based on an imbalance of transmitted power from multiple antennas of a user equipment and based on the message, compensating for the imbalance by varying a transmit power from one or more of the multiple antennas.

Certain aspects of the present disclosure provide an apparatus for wireless communications. The apparatus includes means for receiving a differential power control message that is based on an imbalance of transmitted power from multiple antennas of a user equipment and based on the message, means for compensating for the imbalance by varying a transmit power from one or more of the multiple antennas.

Certain aspects of the present disclosure provide an apparatus for wireless communications. The apparatus generally includes at least one processor configured to receive a differential power control message that is based on an imbalance of transmitted power from multiple antennas of a user equipment and, based on the message, to compensate for the imbalance by varying a transmit power from one or more of the multiple antennas.

Certain aspects provide a computer-program product for wireless communications. The computer-program product includes a computer-readable storage medium having instructions stored thereon, the instructions for causing a computer to receive a differential power control message that is based on an imbalance of transmitted power from multiple antennas of a user equipment and based on the message, to compensate for the imbalance by varying a transmit power from one or more of the multiple antennas.

Various aspects and features of the disclosure are described in further detail below.

BRIEF DESCRIPTION OF THE DRAWINGS

So that the manner in which the above recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

In multi-antenna transmit systems, the received power from multiple antennas may be unequal. Examples contributing to the power imbalance include UE) power setting errors, antenna gain imbalance (AGI), shadowing, body losses, and short and long term fade. For some aspects, the imbalance may be compensated for by applying a correction fed back from the receiver. Making such a correction may be sufficient at low transmit power levels but may be detrimental to power consumption and battery life at high transmit power levels. For some aspects, the correction may be a function of, not only the imbalance observed and fed back by the receiver, but also a function of the current transmit power. The current transmit power may be known accurately by the transmitter and, therefore, the range compression of the imbalance compensation at high power levels may be performed by the transmitter.

The techniques described herein can be used for various wireless communication networks, such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), CDMA2000, etc.

UTRA includes Wideband-CDMA (W-CDMA) and Low Chip Rate (LCR). CDMA2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). LTE is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). For clarity, certain aspects of the techniques are described below for LTE, and LTE terminology is used in much of the description below.

Single carrier frequency division multiple access (SC-FDMA) utilizes single carrier modulation and frequency domain equalization. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. SC-FDMA is used for uplink multiple access scheme in LTE.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 1:
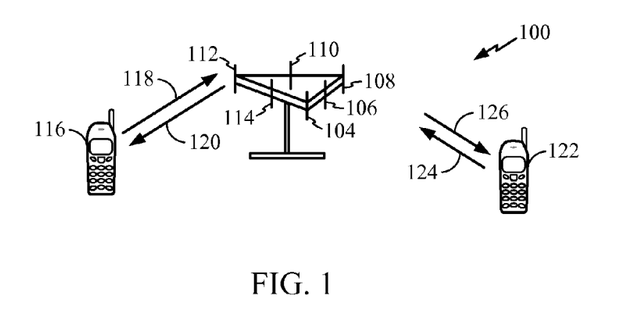
FIG. 1 illustrates a block diagram of a multiple access wireless communication system, in accordance with certain aspects of the present disclosure.

Referring to FIG. 1, a multiple access wireless communication system is illustrated, in accordance with certain aspects of the present disclosure. An access point 100 (AP) includes multiple antenna groups, one including 104 and 106, another including 108 and 110, and an additional including 112 and 114. In FIG. 1, only two antennas are shown for each antenna group, however, more or fewer antennas can be utilized for each antenna group. Access terminal 116 (AT) (e.g., a UE) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 can use different frequencies for communication. For example, forward link 120 can use a different frequency than that used by the reverse link 118. For some aspects, access terminals 116, 122 may perform the operations described above, wherein the range compression of the imbalance compensation at high power levels may be performed by the terminals 116, 122.

Each group of antennas and/or the area in which they are designed to communicate is often referred to as a sector of the access point. In one aspect, antenna groups each are designed to communicate to access terminals in a sector of the area covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point can be a fixed station used for communicating with the terminals and can also be referred to as a base station, a Node B, an evolved Node B (eNB), or some other terminology. An access terminal can also be called a mobile station, UE, a wireless communication device, terminal, access terminal or some other terminology.

Figure 2:
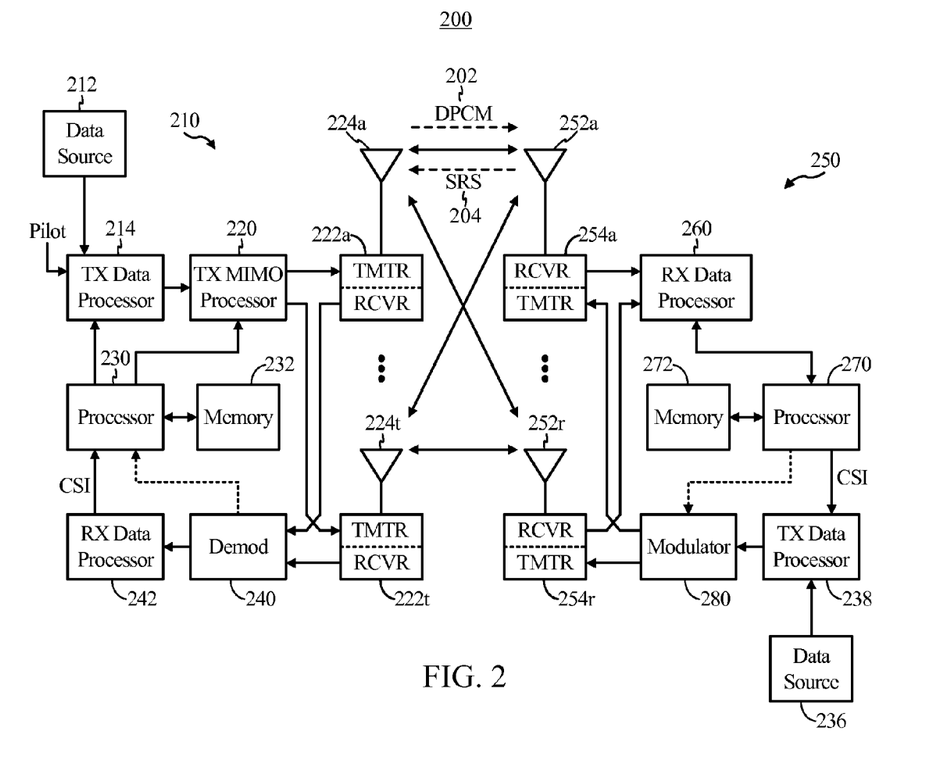
FIG. 2 illustrates a block diagram of a wireless communication system, in accordance with certain aspects of the present disclosure.

FIG. 2 is a block diagram of an aspect of a transmitter system 210 (also referred to as an access point) and a receiver system 250 (also referred to as an access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., binary phase shift keying (BPSK), quadrature phase shift keying (QPSK), M-PSK, or quadrature amplitude modulation (M-QAM)) selected for that data stream to provide modulation symbols. The data rate, coding, and modulation for each data stream may be determined by instructions performed by processor 230. Memory 232 may store data and program codes for transmitter system 210.

The modulation symbols for all data streams are then provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively. For some aspects, a differential power control message (DPCM 202) may be transmitted from antennas 224a through 224t, as will be described further herein.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. Memory 272 may store data and program codes for receiver system 250.

The reverse link message can comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 performs beamforming on the extracted message using a pre-coding matrix. For some aspects, sounding reference signals (SRS 204) may be transmitted by antennas 252a through 252r, and may be measured at the transmitter system 210, as will be described further herein.

In multi-antenna transmit systems, the received power from multiple antennas may be unequal. Examples contributing to the power imbalance comprise user equipment (UE) power setting errors, antenna gain imbalance (AGI), shadowing, body losses, and short and long term fade. For some aspects, the imbalance may be compensated for by applying a correction fed back from the receiver. Making such a correction may be sufficient at low transmit power levels but may be detrimental to power consumption and battery life at high transmit power levels. For some aspects, the correction may be a function of, not only the imbalance observed and fed back by the receiver, but also a function of the current transmit power. The current transmit power may only be known accurately by the transmitter and, therefore, the range compression of the imbalance compensation at high power levels may be performed by the transmitter.

Uplink MIMO may have an impact on a number of aspects of power control formulation, such as point of applicability of a power control equation (e.g., power control per codeword, per layer, per antenna, or per total transmission) and formulation of each term in the power control equation (e.g., path loss per antenna or average over antennas; transport format (TF) delta term per codeword, per layer, or average TF delta). In general, the power control in LTE Advanced (LTE-A), as in LTE, may be targeted at counteracting slow fade, shadowing changes, and acting as an enabler of inter-cell interference coordination (ICIC), as opposed to inverting short term fade. Intra-cell users may be orthogonalized (setting aside multi-user MIMO (MU-MIMO)) and, therefore, power fluctuations may have only inter-cell impact.

In an ideal case, the average received power at an eNB from the MIMO antennas from a UE should be the same. Rel-8 power control formulation would be more or less applicable and not much would need to be done. However, for situations further described below, power from the MIMO antennas may not be equal. For some aspects, power control may be based on a trade-off between efficiently utilizing UE battery power (metric A) and efficiently using E-UTRAN resources (metric B) while maximizing link throughput.

For some aspects, with the assumption of battery consumption being proportional to output power ($P_{out}$) (which may not be the case in general), the appropriate metric may be to evaluate link performance of different power control schemes under the constraint of a constant long term conducted power sum across antennas (metric A). Under this condition, appropriate schemes may be channel gain weighted $P_{out}$ allocation for rank 1 transmissions (and for layers mapped to multiple antennas, e.g., rank 2 transmission) and water filling for rank transmissions greater than 1.

For some aspects, with the assumption that battery consumption is not a factor (e.g., because in low power regimes a power amplifier (PA) power may be insignificant compared to the power consumption of other UE blocks), the appropriate metric may be to evaluate link performance of different power control schemes under the constraint that the long term radiated power sum across antenna is the same (metric B). Under this condition, complete inversion of AGI and inversion of shadowing may lead to appropriate results since the assumption may be equivalent to removing AGI at no cost (except for signaling overhead). The power control trade-offs may be different in different $P_{out}$ regimes.

Figure 3:
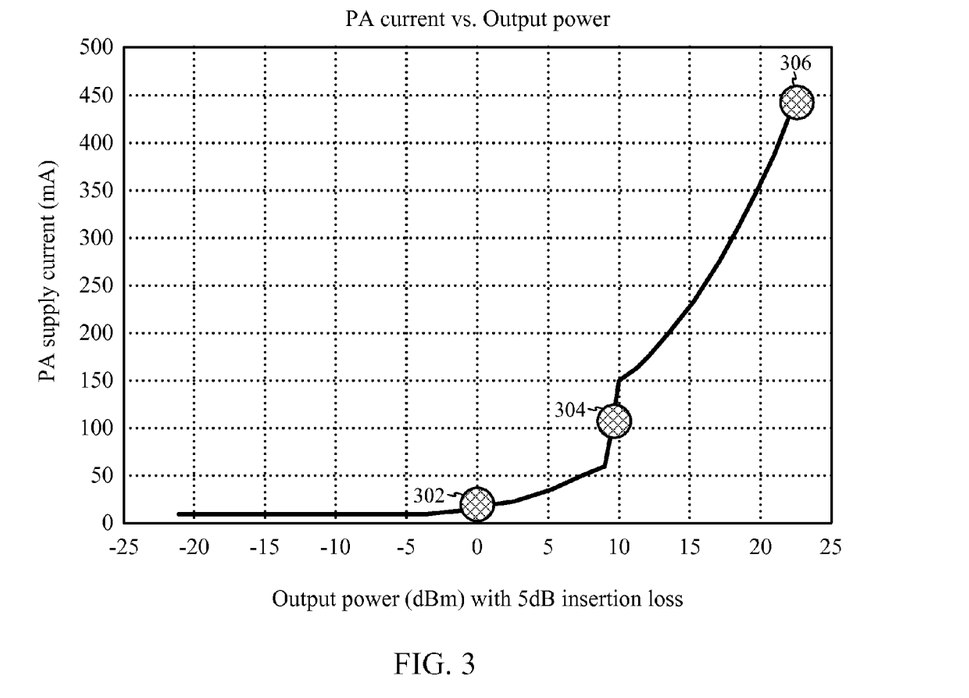
FIG. 3 illustrates a relationship of a multi-state power amplifier (PA) current versus $P_{out}$, in accordance with certain aspects of the present disclosure.

FIG. 3 is a graph illustrating a relationship of PA current at multiple stages, in accordance with certain aspects of the present disclosure. When the UE operates in a low power regime, the transmission chain power consumption may not dominate the UE power use and, therefore, may not determine battery life. For example, for $P_{out}$ less than 0 dBm (e.g., below 302), the PA power consumption may be insignificant and dominated by quiescent current (i.e., may not depend on $P_{out}$). For $P_{out}$ greater than or equal to 0 dBm and less than 10 dBm (e.g., between 302 and 304), the PA power consumption may depend on $P_{out}$ but may only be a moderately significant factor in total power consumption. However, for $P_{out}$ greater than or equal to 10 dBm (e.g., between 304 and 306), the PA may be a significant contributor to total power consumption and the PA power may strongly depend on $P_{out}$ (e.g., proportional to square root of $P_{out}$). For some aspects, for the purpose of evaluation of power control strategies, for $P_{out}$ greater than or equal to 10 dBm, metric A may be used (i.e., efficiently utilizing UE battery power), and for $P_{out}$ less than 10 dBm, metric B may be used (i.e., efficiently using E-UTRAN resources).

Figure 4:
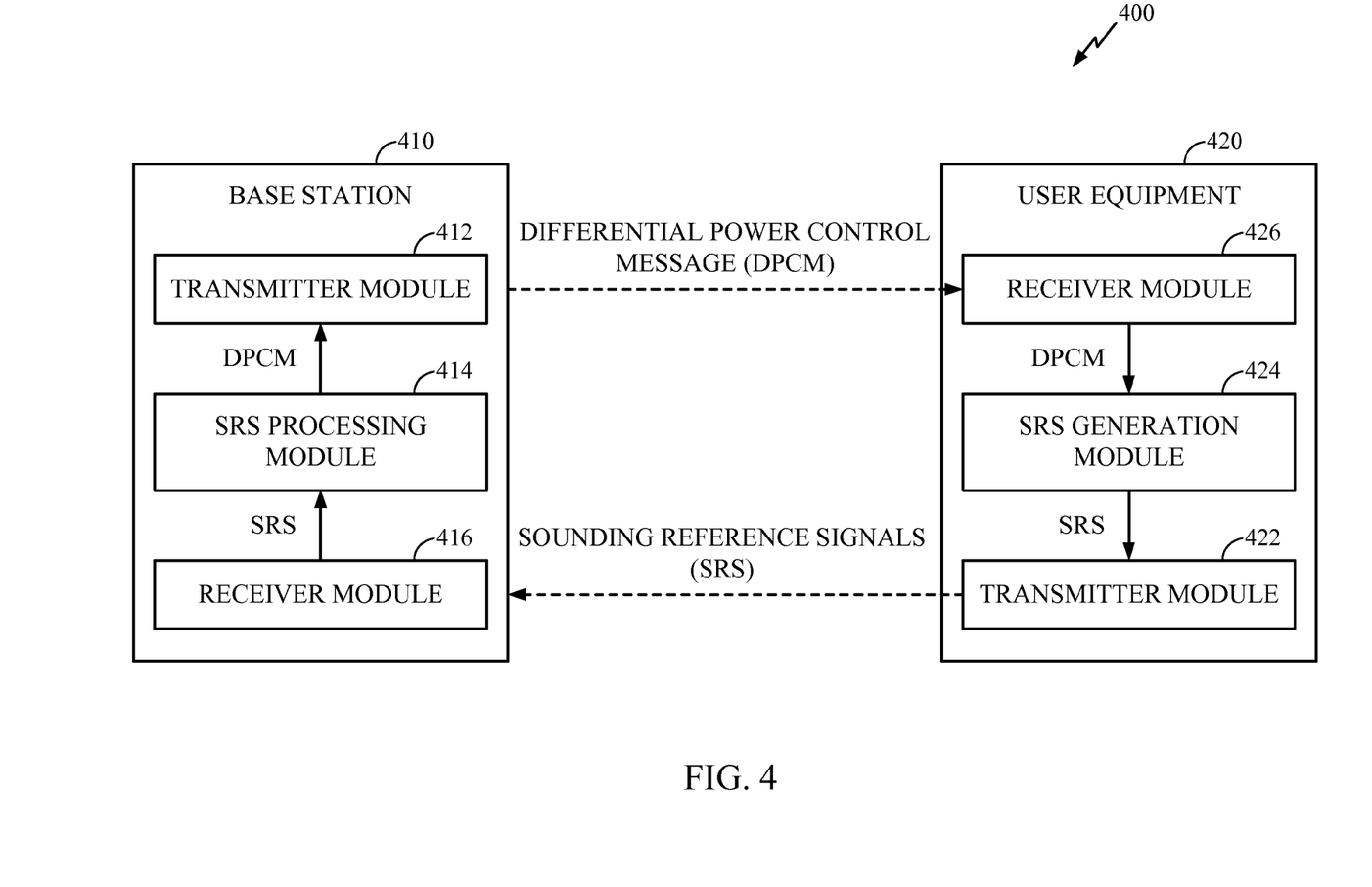
FIG. 4 illustrates an user equipment (UE) and base station, in accordance with certain aspects of the present disclosure.

FIG. 4 illustrates an example system 400 with a base station (BS) 410 (e.g., an eNB) and UE 420, capable of performing the range compression of the imbalance compensation at high power levels described herein. As illustrated, the UE 420 may include an SRS generation module 424. The SRS generation module 424 may generate one or more SRSs to be transmitted, via a transmitter module 422, to the BS 410. The BS 410 may receive a SRS via a receiver module 416. The BS 410 may configure a differential power control message (DPCM), after measuring the SRS via an SRS processing module 414. The DPCM may be transmitted, via a transmitter module 412, to the UE 420.

In this manner, power imbalance at the UE 420 may be compensated for by applying the DPCM fed back from the BS 410. As described above, the compensation may be a function of, not only the imbalance observed and fed back by the BS 410, but also a function of the current transmit power at the UE 420. The current transmit power may only be known accurately by the UE 420 and, therefore, the range compression of the imbalance compensation at high power levels may be performed by the UE 420.

Figure 5:
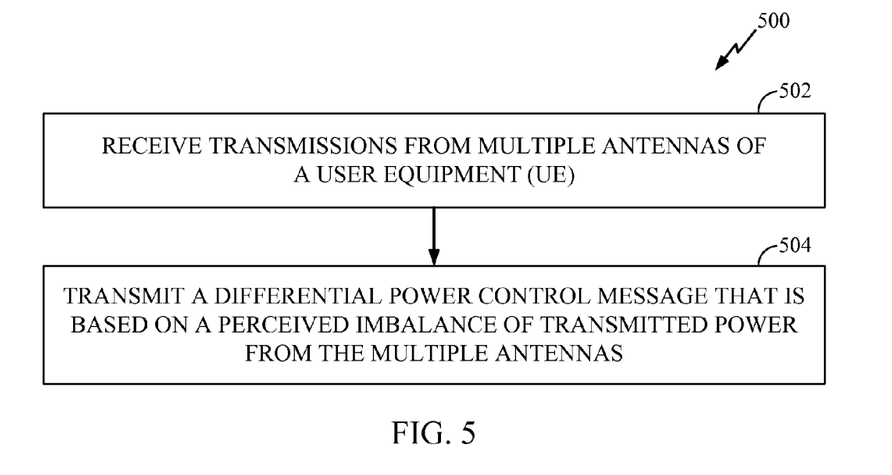
FIG. 5 illustrates a method for transmitting a differential power control message (DPCM) based on a perceived imbalance of transmitted power from multiple antennas of a UE, in accordance with certain aspects of the present disclosure.

FIG. 5 illustrates a method 500 for transmitting a differential power control message (DPCM) based on a perceived imbalance of transmitted power from multiple antennas of a UE, in accordance with certain aspects of the present disclosure. The operations 500 may be performed, for example, by a serving eNB for sending the DPCM.

At 502, the serving eNB may receive transmissions from multiple antennas of a UE. For some aspects, the transmissions may be a SRS from each of the antenna of the UE. For other aspects, the transmissions may be a demodulation reference signal (DM-RS) from each of the antenna of the UE.

At 504, the serving eNB may transmit the DPCM that is based on a perceived imbalance of transmitted power from the multiple antennas.

Figure 6:
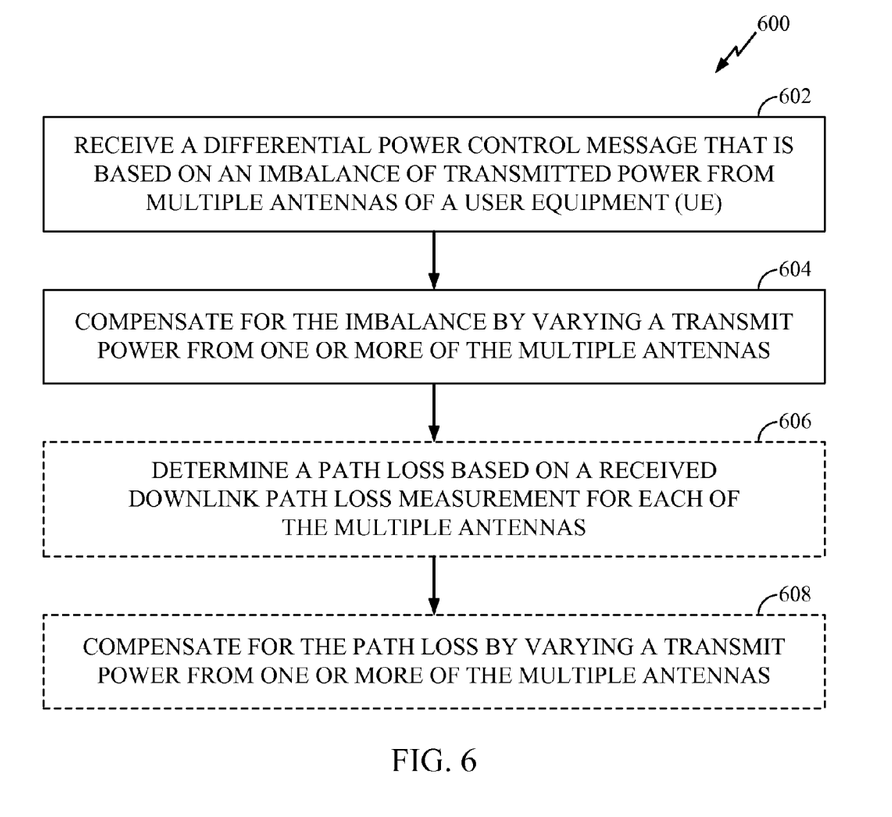
FIG. 6 illustrates a method for compensating for an imbalance of transmitted power from the multiple antennas of the UE upon receiving the DPCM, in accordance with certain aspects of the present disclosure.

FIG. 6 illustrates a method 600 for compensating for an imbalance of transmitted power from the multiple antennas of the UE upon receiving the DPCM, in accordance with certain aspects of the present disclosure. The operations 600 may be performed, for example, by the UE for transmission power dependent imbalance compensation.

At 602, the UE may receive, from a BS (e.g., serving eNB), a differential power control message that is based on an imbalance of transmitted power from multiple antennas of the UE. For some aspects, the message may comprise a common value and a differential value. The common value may apply for all the antennas of the UE. For some aspects, the rate of the updates for the common value and the differential value may be different. For example, the differential value may be received less frequently than the common value.

At 604, based on the message, the UE may compensate for the imbalance by varying a transmit power from one or more of the multiple antennas. For some aspects, the compensation for the imbalance may be based on the differential value. For some aspects, the compensation for the imbalance may be based on a combination of the differential value and prior received differential values. For some aspects, the compensation for the imbalance may be based on a current transmit power of the UE, as described below. For some aspects, the transmit power of the UE may remain the same upon varying the transmit power from one or more of the multiple antennas. For some aspects, the transmit power of the UE may be equal to a sum of the transmitted power from the multiple antennas of the UE. For some aspects, the compensation for the imbalance may be applied to the SRS from each of the multiple antennas.

Optionally, at 606, the UE may determine a path loss based on a received downlink path loss measurement for each of the multiple antennas. At 608, based on the measurement for each of the multiple antennas, the UE may compensate for the path loss by varying a transmit power from one or more of the multiple antennas.

Figure 7:
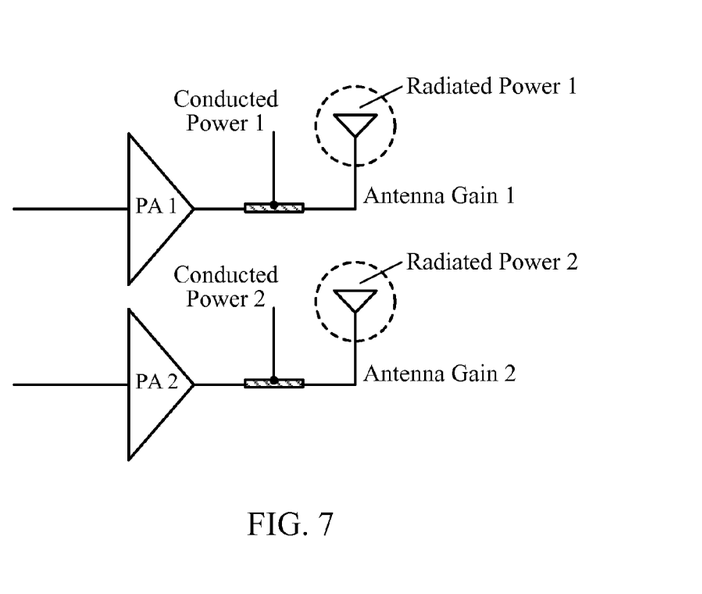
FIG. 7 illustrates test points for conducted power and radiated power, in accordance with certain aspects of the present disclosure.

FIG. 7 illustrates example test points for conducted power and radiated power, in accordance with certain aspects of the present disclosure. Power control with and without AGI compensation may be evaluated with, for example, 0 dB, 3 dB and 6 dB AGI. For some aspects, the evaluation may be based on a comparison between throughput and signal-to-noise ratio (SNR), where the 'signal' component of the SNR may be based on considering the conducted power with metric A and radiated power with metric B. At high power (e.g., $P_{out}$ greater than or equal to 10 dBm), under metric A, AGI compensation for an antenna may reduce throughput. For example, with AGI compensation, there may be up to a 2.5 dB loss at high SNR. However, at low power (e.g., $P_{out}$ less than 10 dBm), under metric B, AGI compensation for an antenna may increase throughput. For example, with AGI compensation, there may be up to a 1 dB gain.

For some aspects, capability of over the air AGI compensation may be added. This may be achieved by power offset commands sent by the eNB to the UE. The offset may be interpreted as a 'static' power offset between a conducted transmitted power to be applied on top of the regular (i.e., per codeword or total across antennas) power control. The AGI compensation may be made at a significantly lower rate than regular power control and an implicit action time of applying the AGI compensation may not be needed. However, due to the negative impact of AGI compensation on battery life, a sliding scale or step function may be defined for the AGI compensation range. For example, the UE may limit AGI compensation as:

0 dB if 23 dBm>$P_{out}$≥20 dBm,
2 dB if 20 dBm>$P_{out}$≥15 dBm,
3 dB if 15 dBm>$P_{out}$≥10 dBm, and
6 dB if 10 dBm>$P_{out}$.

Transmitter AGI at the UE is a common source of long term receive power imbalance at the eNB. Although AGI may be a significant factor, other sources of imbalance comprise UE transmitted power calibration errors, shadowing, and path loss.

Figure 8:
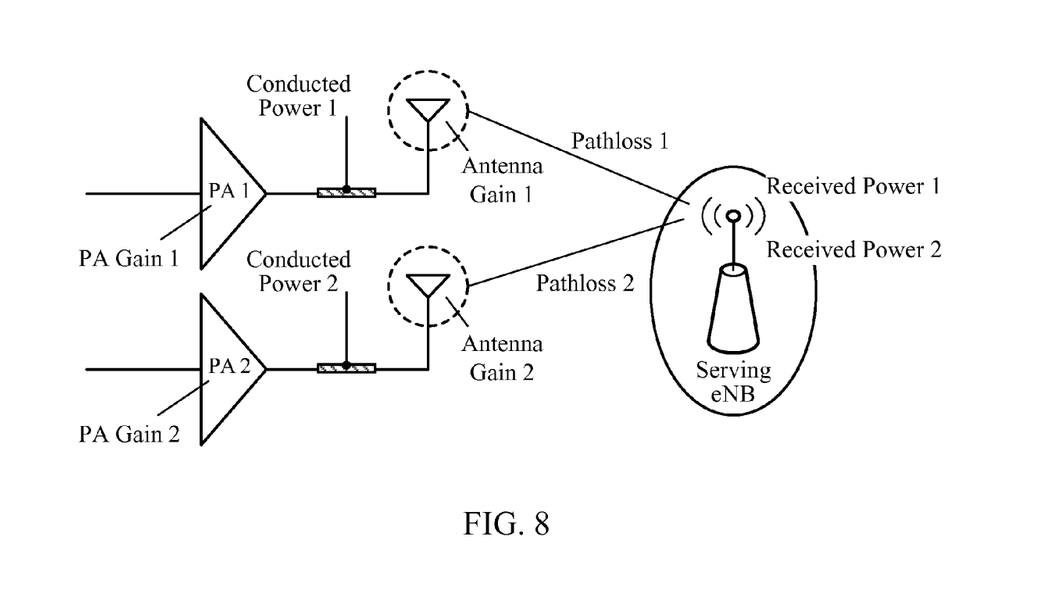
FIG. 8 illustrates different antenna imbalance sources, in accordance with certain aspects of the present disclosure.

FIG. 8 illustrates different antenna imbalance sources, in accordance with certain aspects of the present disclosure. For UE transmitted power calibration errors, at low power levels, the circuitry to measure actual UE output power may be ineffective and, therefore, the UE may not actually know its output power accurately. This in itself may create imbalance even without any AGI. For some aspects, such errors may be compensated for by eNB feedback. For AGI, the UE may have different quality antennas for a 'primary' and 'secondary' chain by design. The standard may set appropriate limits for this difference. For some aspects, such differences may be compensated for in the low power regime but may not be compensated for in the high power regime. For shadowing and path loss, the different UE antennas may experience different body losses, for example. However, these differences may or may not be compensated for, as will be discussed below.

For UE transmitted power calibration errors, at low power levels, the circuitry to measure actual output power may be ineffective and, therefore, the UE may not actually know the output power accurately. An example of allowed UE power setting errors are given below (Table 1):

| $P_{CMAX}$ (dBm) | Tolerance T($P_{CMAX}$) (dB) |
|---|---|
| 21 ≤ $P_{CMAX}$ ≤ 23 | 2.0 |
| 20 ≤ $P_{CMAX}$ < 21 | 2.5 |
| 19 ≤ $P_{CMAX}$ < 20 | 3.5 |
| 18 ≤ $P_{CMAX}$ < 19 | 4.0 |
| 13 ≤ $P_{CMAX}$ < 18 | 5.0 |
| 8 ≤ $P_{CMAX}$ < 13 | 6.0 |
| −40 ≤ $P_{CMAX}$ < 8 | 7.0 |

In the medium to low power regime, the UE power setting error may be quite large, wherein ±14 dB between the conducted powers on two transmitter chains may be possible. The tolerances given in the table above are for UE max power and may not be directly applicable to the UE power setting. However, they may be viewed as a good indication of the expected UE absolute power setting tolerance.

Although the allowed (and expected) power setting errors may be quite large, the errors may be symmetric across two transmitter chains if matched components are used. If expected relative power setting errors are large, there may be a definite use case for over-the-air relative power compensation. Unlike AGI compensation, there may be no battery life cost aside from the signaling overhead. It should be also considered, however, that power setting errors may not be constant across the power range, which may make compensation less useful if the UL RB allocation size and, therefore, the UE transmitted power widely varies.

For some aspects, per antenna downlink (DL) path loss measurement and per antenna open loop power control may be enabled based on a DL measurement. The benefit of such a mechanism is that, without any over-the-air signaling overhead, both the AGI and path loss differences may be automatically compensated for. This may make per antenna open loop component an attractive choice. However, there may be a few issues with per antenna path loss compensation, as will be described below.

Path loss may not capture transmitted power calibration errors. Therefore, an additional closed loop compensation scheme may be required. At high power levels, path loss compensation may be detrimental to battery life and, therefore, it may be beneficial to switch to average path loss for high power cases.

Path loss measurements may be sensitive to receiver chain calibration errors and in general have large calibration errors. An example of open loop power tolerance requirements is given below (Table 2):

| Conditions | Tolerance |
|---|---|
| Normal | ±9.0 dB |
| Extreme | ±12.0 dB |

The tolerances above are for a conducted measurement. Therefore, the UE may be allowed (and expected) to make large power setting errors even when there is no AGI. Assuming the worst case, the UE may create a quite large, ±24 dB power imbalance per antenna open loop even when there is no AGI. Considering the typical range of AGI, it may be that per antenna open loop compensation may create larger errors than the AGI itself.

By comparing Tables 1 and 2, approximately 2 dB to 5 dB range may be reserved for low noise amplifier (LNA) calibration errors, which may be an extra undesired term for per antenna open loop path loss compensation. The errors may be to a large degree symmetric between the different transmitter chains or receiver chains.

Figure 9:
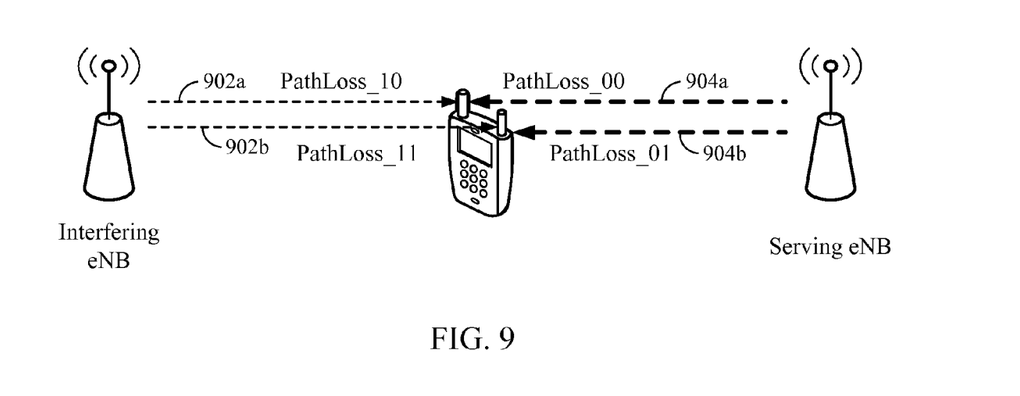
FIG. 9 illustrates path loss terms to different base stations, in accordance with certain aspects of the present disclosure.

FIG. 9 illustrates path loss terms to different eNBs, in accordance with certain aspects of the present disclosure. The path loss imbalance may be different towards the serving eNB versus another eNB the UE may be interfering with (interfering eNB), which in this case the gain in link performance to the serving eNB may be negated by increased interference to other cells (e.g., the interfering eNB). For example, a gain in link performance 904a, 904b to the serving eNB may be negated by increased interference 902a, 902b to the interfering eNB.

For some aspects, when the path loss differentials are symmetric, i.e., when the following equality, PathLoss_00(dB)−PathLoss_01(dB)=PathLoss_10(dB)−PathLoss_11(dB)

is approximately satisfied then path loss compensation makes sense. In particular, when the following condition holds, PathLoss_00(dB)−PathLoss_01(dB)>0 and

PathLoss_10(dB)−PathLoss_11(dB)>PathLoss_00(dB)−PathLoss_01(dB), then there may be a large gain with path loss compensation since the received signal at the serving eNB may increase more than the received interference at the interfering eNB, even in absolute terms. However, if the following condition holds, PathLoss_00(dB)−PathLoss_01(dB)>0 and

PathLoss_11(dB)−PathLoss_10(dB)>PathLoss_00 (dB)−PathLoss_01(dB), then the path loss compensation may be detrimental to system capacity for some aspects, since interference may increase more than the desired signal power increase. For some aspects, the application of per antenna path loss compensation may be made optional by L3 signaling. For some aspects, if per antenna path loss compensation is implemented, the path loss compensation may be disabled by the eNB by UL power control configuration.

Figure 10:
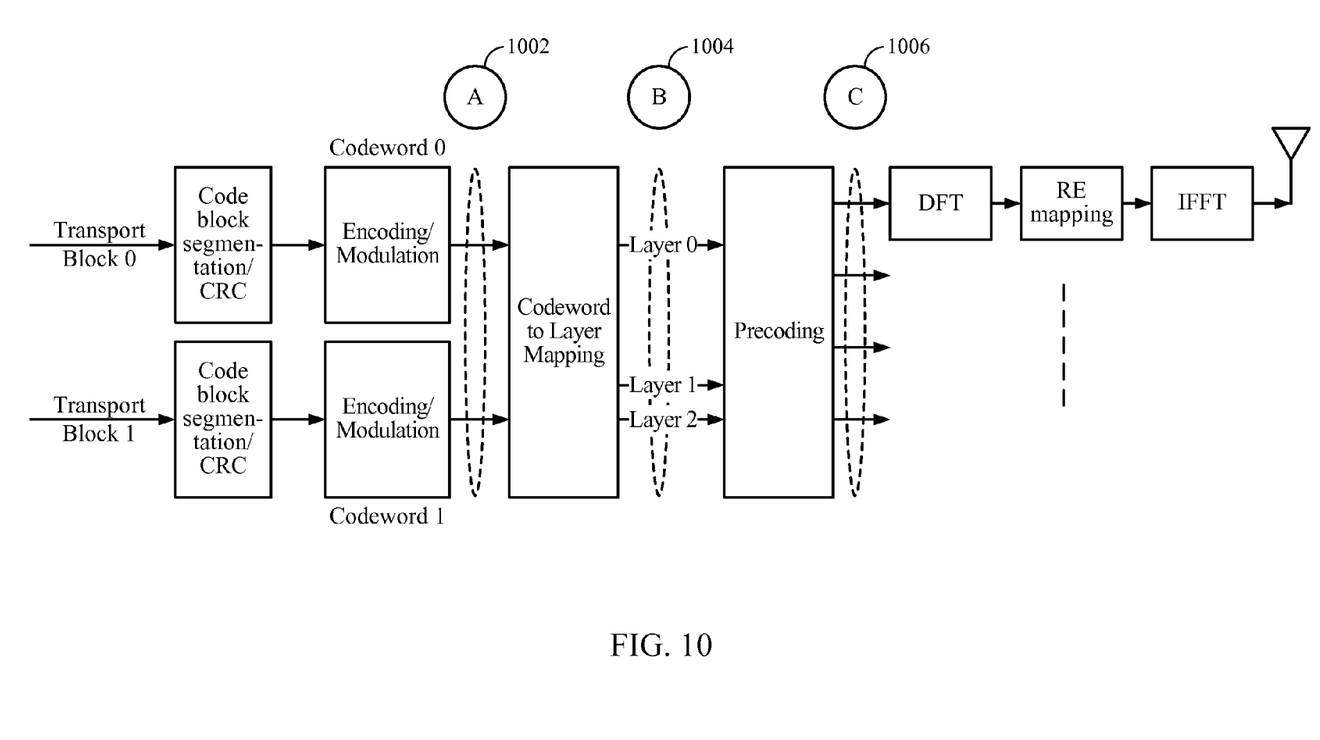
FIG. 10 illustrates power control reference points, in accordance with certain aspects of the present disclosure.

FIG. 10 illustrates power control reference points 1002, 1004, 1006 for controlling power, in accordance with certain aspects of the present disclosure. The reference point for power control in Rel-8 was arbitrary since the entire transmitter chain may be considered linear for specification purposes. However, in Rel-10 UL MIMO, choosing different reference points may have different meanings. For example, if a certain MCS power control delta is calculated for a given codeword then the delta may be applied to layers of the codeword or rather to the antennas associated with each of those layers.

The Rel-8 power control for PUSCH is given as follows:

$$P_{PUSCH}(i) = \min\{P_{CMAX}, 10\log_{10}(M_{PUSCH})(i)) + P_{O\_PUSCH}(j) + \alpha(j) \cdot PL + \Delta_{TF}(i) + f(i)\}.$$

For some aspects, using the following index notation:
i: is subframe index,
k: Tx antenna index,
j: PUSCH transmission type (e.g., semi-persistent or dynamically scheduled, etc.), and
m: Codeword index,
the multi-antenna transmission scheme may be the following:

$$P_{PUSCH}(i,k) = \min\{P_{max}(k), 10\log_{10}(M_{PUSCH}(i) + 10\log_{10}(S(i,k)) \ldots + P_{O\_PUSCH}(j) + \alpha(j,k) \cdot \Delta_{TF}(i,m) + f(i) + g(i,k) + h(L(i,m)) + H(L(i))\},$$

where $P_{MAX}(k)$ is the per antenna maximum power, $M_{PUSCH}(i)$ is the bandwidth of physical uplink shared channel (PUSCH) resource allocation valid in subframe i (may be summed over clusters), $S(i,k)$ is the precoder scale factor, $P_{O\_PUSCH}(j)$ is the power offset, $PL(k)$ is the path loss measurement on antenna k, $\alpha(i,k)$ is the path loss coefficient, $\Delta_{TF}(i,m)$ is the transmission format delta in subframe i for codeword m, $f(i)$ is the transmit power control (TPC) (common across all antennas), $g(i,k)$ is the per antenna relative power control (only adjusts relative power between antennas), $h(l(i,m))$ is the multi-layer power adjustment ($l(i,m)$ is the number of layers in codeword m in subframe i), and $H(L(i))$ is the MIMO power adjustment ($L(i)$ is the total number of layers in subframe i).

For some aspects, $$P_{MAX}(k) = \frac{P_{CMAX}}{N_{Tx}}$$

may be used, where $N_{Tx}$ is the number of Tx antennas at the UE. However, if per antenna power control is applied then $P_{MAX}(k)$ may also be a function of the other antenna transmit powers so that $$\sum_{k=1}^{N_{Tx}} P_{MAX}(k) \le P_{CMAX}$$

is satisfied. Per antenna scaling for maintaining the total power limit may or may not be UE implementation dependent.

$S(i,k)$ may depend on the precoder used in subframe i. $S(i,k)$ may be required to be implemented for making turn-off factors effective. For some aspects, this makes total power jump 3 dB due to transmit precoding matrix indication (TPMI) change.

$PL(k)$ may be similar as in Rel-8 but without combining across Rx paths. Per antenna elements may be arranged in a $N_{Tx} \times 1$ column vector.

$\alpha(i,k)$ is an $N_{Tx} \times N_{Tx}$ coefficient 'matrix'. For example, per antenna path loss compensation is enabled when $\alpha(i,k) = I_{N_{Tx} \times N_{Tx}}$. Other pre-defined $\alpha(i,k)$ may be possible but the number of options may be limited to only a few. The path loss factors may be converted to linear before applying any weighted averaging across antennas and converted back to dB after.

$\Delta_{TF}(i,m)$ may be determined per codeword and applied to each layer of the codeword. Then the coefficient for each layer may be applied to each antenna associated with that layer.

$g(i,k)$ may be sent at a slower rate and with limited dynamic range.

$h(l(i,m))$ is a function of $l(i,m)$ where $l(i,m)$ is the number of layers in codeword m in subframe i. Its purpose is similar to that of $\Delta_{TF}(i,m)$. However, the intrinsic coefficient (such as $K_S$ for $\Delta_{TF}$) may be different. For some aspects, $h(l(i,m)) = 10\log_{10}(l(i,m))$. $h(l(i,m))$ may be applied to each antenna k that is associated with layer $l(i,m)$ through the precoder in subframe i.

$H(L(i))$ is a function of $L(i)$, where $L(i)$ is the total number of SU-MIMO layers in the current subframe. $H(L(i))$ may be useful if a stable correlation is proved to exist between the number of layers and the power adjustment needed to ensure an approximate first transmission block error rate (BLER).

In the above formulation, the multi-layer power control adjustment ($h(l(i,m))$) may not be disabled. Disabling multi-layer power control could be achieved, however, with an additional signaled parameter, similar to $K_S$.

The calculation method for $\Delta_{TF}(i)$ was specified in Rel-8 as $$\Delta_{TF}(i) = 10\log_{10}((2^{MPR \cdot K_S} - 1)\beta_{offset}^{PUSCH}) \text{ for } K_S = 1.25$$
$$\text{and 0 for } K_S = 0.$$

where MPR is calculated as $$\sum_{r=0}^{C-1} K_r / N_{RE}$$

In the MIMO case, this may be modified as to apply to each codeword m (up to 2) individually $$\Delta_{TF}(i,m) = 10\log_{10}((2^{MPR_m \cdot K_S} - 1)\beta_{offset}^{PUSCH})$$

where $MPR_M$ is calculated as $$MPR_M = \sum_{r=0}^{C_m-1} \frac{K_r}{N_{RE} \cdot l(m)}$$

where $l(m)$ is the number of layers in codeword m.

The various operations of methods described above may be performed by various hardware and/or software component(s). The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
receiving transmissions from multiple antennas of a user equipment; and
transmitting a differential power control message that is based on an imbalance of transmitted power from the multiple antennas, wherein the differential power control message includes a common value and a differential value that is transmitted less frequently than the common value.

2. The method of claim 1, wherein the receiving the transmissions includes receiving one of a sounding reference signal and a demodulation reference signal from each of the multiple antennas.

3. An apparatus for wireless communications, comprising:
means for receiving transmissions from multiple antennas of a user equipment; and
means for transmitting a differential power control message that is based on an imbalance of transmitted power from the multiple antennas, wherein the differential power control message includes a common value and a differential value that is transmitted less frequently than the common value.

4. The apparatus of claim 3, wherein the means for receiving the transmissions includes means for receiving one of a sounding reference signal and a demodulation reference signal from each of the multiple antennas.

5. An apparatus for wireless communications, comprising:
at least one processor configured to receive transmissions from multiple antennas of a user equipment and to transmit a differential power control message that is based on an imbalance of transmitted power from the multiple antennas, wherein the differential power control message includes a common value and a differential value that is transmitted less frequently than the common value.

6. The apparatus of claim 5, wherein the at least one processor is configured to receive one of a sounding reference signal and a demodulation reference signal from each of the multiple antennas.

7. A computer-program product comprising a non-transitory computer-readable storage medium, the non-transitory computer-readable storage medium comprising:
instructions for causing a computer to receive transmissions from multiple antennas of a user equipment; and
instructions for causing the computer to transmit a differential power control message that is based on an imbalance of transmitted power from the multiple antennas, wherein the differential power control message includes a common value and a differential value that is transmitted less frequently than the common value.

8. The computer-program product of claim 7, wherein the instructions for causing the computer to receive the transmissions includes instructions for causing the computer to receive one of a sounding reference signal and a demodulation reference signal from each of the multiple antennas.

9. A method for wireless communications, comprising:
receiving a differential power control message that is based on an imbalance of transmitted power from multiple antennas of a user equipment (UE), wherein the differential power control message includes a common value and a differential value that is transmitted less frequently than the common value; and based on the message, compensating for the imbalance by varying a transmit power from one or more of the multiple antennas.

10. The method of claim 9, wherein the compensating for the imbalance is based on the differential value.

11. The method of claim 9, wherein the compensating for the imbalance is based on a combination of the differential value and a prior received differential value.

12. The method of claim 9, wherein the compensating for the imbalance is further based on a current transmit power of the UE.

13. The method of claim 9, wherein a transmit power of the UE remains substantially the same upon varying the transmit power from the one or more of the multiple antennas.

14. The method of claim 13, wherein the transmit power of the UE is equal to a sum of the transmitted power from the multiple antennas of the UE.

15. The method of claim 9, further including:
determining a path loss based on a received downlink path loss measurement for each of the multiple antennas; and
based on the measurement for each of the multiple antennas, compensating for the path loss by varying a transmit power from one or more of the multiple antennas.

16. The method of claim 9, further including transmitting one of a sounding reference signal (SRS) and a demodulation reference signal (DM-RS) from each of the multiple antennas.

17. The method of claim 16, wherein the compensating for the imbalance is applied to the one of the SRS and the DM-RS from each of the multiple antennas.

18. An apparatus for wireless communications, comprising:
means for receiving a differential power control message that is based on an imbalance of transmitted power from multiple antennas of a user equipment (UE), wherein the differential power control message includes a common value and a differential value that is transmitted less frequently than the common value; and
means for compensating for the imbalance, based on the message, by varying a transmit power from one or more of the multiple antennas.

19. The apparatus of claim 18, wherein the means for compensating for the imbalance is based on the differential value.

20. The apparatus of claim 18, wherein the means for compensating for the imbalance is based on a combination of the differential value and a prior received differential value.

21. The apparatus of claim 18, wherein the means for compensating for the imbalance is further based on a current transmit power of the UE.

22. The apparatus of claim 18, wherein a transmit power of the UE remains substantially the same upon varying the transmit power from one or more of the multiple antennas.

23. The apparatus of claim 22, wherein the transmit power of the UE is equal to a sum of the transmitted power from the multiple antennas of the UE.

24. The apparatus of claim 18, further including:
means for determining a path loss based on a received downlink path loss measurement for each of the multiple antennas; and
means for compensating for the path loss, based on the measurement for each of the multiple antennas, by varying a transmit power from one or more of the multiple antennas.

25. The apparatus of claim 18, further including means for transmitting one of a sounding reference signal (SRS) and a demodulation reference signal (DM-RS) from each of the multiple antennas.

26. The apparatus of claim 25, wherein the means for compensating for the imbalance is applied to the one of the SRS and the DM-RS from each of the multiple antennas.

27. An apparatus for wireless communications, comprising:
at least one processor configured to receive a differential power control message that is based on an imbalance of transmitted power from multiple antennas of a user equipment (UE) and, based on the message, to compensate for the imbalance by varying a transmit power from one or more of the multiple antennas, wherein the differential power control message includes a common value and a differential value that is transmitted less frequently than the common value.

28. The apparatus of claim 27, wherein the compensation for the imbalance is based on the differential value.

29. The apparatus of claim 27, wherein the compensation for the imbalance is based on a combination of the differential value and a prior received differential value.

30. The apparatus of claim 27, wherein the compensation for the imbalance is further based on a current transmit power of the UE.

31. The apparatus of claim 27, wherein the at least one processor is further configured to:
determine a path loss based on a received downlink path loss measurement for each of the multiple antennas; and
based on the measurement for each of the multiple antennas, compensate for the path loss by varying a transmit power from one or more of the multiple antennas.

32. A computer-program product comprising a non-transitory computer-readable storage medium, the non-transitory computer-readable storage medium comprising:
instructions for causing a computer to receive a differential power control message that is based on an imbalance of transmitted power from multiple antennas of a user equipment (UE), wherein the differential power control message includes a common value and a differential value that is transmitted less frequently than the common value; and
instructions for causing the computer to compensate for the imbalance, based on the message, by varying a transmit power from one or more of the multiple antennas.

33. The computer-program product of claim 32, wherein the compensation for the imbalance is based on the differential value.

34. The computer-program product of claim 32, wherein the compensation for the imbalance is based on a combination of the differential value and prior received differential values.

35. The computer-program product of claim 32, wherein the compensation for the imbalance is further based on a current transmit power of the UE.

36. The computer-program product of claim 32, wherein the computer-readable storage medium further includes:
instructions for causing the computer to determine a path loss based on a received downlink path loss measurement for each of the multiple antennas; and
instructions for causing the computer to compensate for the path loss, based on the measurement for each of the multiple antennas, by varying a transmit power from one or more of the multiple antennas.

* * * * *